(12) United States Patent
Sasaoka et al.

(10) Patent No.: US 7,046,884 B2
(45) Date of Patent: May 16, 2006

(54) OPTICAL FIBER, OPTICAL FIBER TAPE, OPTICAL CABLE AND OPTICAL CONNECTOR WITH OPTICAL FIBER

(75) Inventors: Eisuke Sasaoka, Yokohama (JP);
Tomoyuki Hattori, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 158 days.

(21) Appl. No.: 10/166,711

(22) Filed: Jun. 12, 2002

(65) Prior Publication Data

US 2004/0213531 A1    Oct. 28, 2004

(30) Foreign Application Priority Data

Jan. 15, 2002    (JP)    ............................. 2002-006240
Jun. 11, 2002    (JP)    ............................. 2002-170496

(51) Int. Cl.
*G02B 6/02* (2006.01)
(52) U.S. Cl. ...................... 385/123; 385/124; 385/125; 385/126; 385/127
(58) Field of Classification Search ......... 385/123–128
See application file for complete search history.

(56) References Cited

U.S. PATENT DOCUMENTS

| | | | |
|---|---|---|---|
| 4,089,586 A | | 5/1978 | French et al. |
| 4,838,643 A | * | 6/1989 | Hodges et al. ............... 385/127 |
| 5,032,001 A | * | 7/1991 | Shang ........................ 385/124 |
| 5,320,659 A | * | 6/1994 | Ishiguro et al. ............... 65/423 |
| 6,266,467 B1 | * | 7/2001 | Kato et al. .................... 385/123 |
| 6,317,549 B1 | * | 11/2001 | Brown ........................ 385/123 |
| 6,347,174 B1 | * | 2/2002 | Onishi et al. ................ 385/122 |
| 6,577,800 B1 | * | 6/2003 | Sarchi et al. ................ 385/123 |
| 6,597,847 B1 | * | 7/2003 | Shamoto et al. ............ 385/123 |
| 6,640,038 B1 | * | 10/2003 | Srikant ....................... 385/127 |
| 6,658,190 B1 | * | 12/2003 | Hirano et al. ................ 385/124 |

FOREIGN PATENT DOCUMENTS

| | | |
|---|---|---|
| EP | 0027223 | 10/1980 |
| JP | 11-281840 | 10/1999 |
| JP | P2002-62451 | 2/2002 |

OTHER PUBLICATIONS

"Optical fiber and Fiber type Devices", Baifu-kan, Jul. 10, 1996, pp. 90-113, with partial English translation.

(Continued)

*Primary Examiner*—Daniel Stcyr
*Assistant Examiner*—Daniel A. Hess
(74) *Attorney, Agent, or Firm*—McDermott Will & Emery LLP

(57) ABSTRACT

The present invention relates to an optical fiber and the like comprising a structure enabling high-density packaging into an optical cable while making it possible to transmit signals with a high bit rate in both of wavelength bands of 1.3 μm and 1.55 μm. For example, this optical fiber is configured so as to have a mode field diameter of 8.0 μm or less at a wavelength of 1.55 μm, a cutoff wavelength of 1.26 μm or less, and a chromatic dispersion with an absolute value of 12 ps/nm/km or less at wavelengths of 1.3 μm and 1.55 μm, thereby yielding an excellent lateral pressure resistance enabling high-density packaging into an optical cable.

50 Claims, 8 Drawing Sheets

OTHER PUBLICATIONS

"Design considerations for 1.38 βm zero-dispersion fiber for access and metropolitan networks", Kazuhide Nakajima et al., The 2001 IEICE Communications Society Conference, SB-12-1 (2001), pp. 37-38.

SPECIALTY Product Descriptions, Laser Components, Germany, 2002.

"Development of a Small Diameter Optical Fiber", Tomotaka Murase et al., Showa Electric Wire & Cable Co., Ltd., p. 232, 2002, with partial English translation.

The New 160 Gigabit WDM Challenge for Submarine Cable Systems, JF. Libert et al., Proceedings of 47th International Wire and Cable Symposium, pp. 375-384 (1998).

Akira Urano et al., Pure Silica Core Dispersion-Shifted Single-Mode Fibers, Proceedings Of The European Conference On Optical Communication, Sep. 13, 1987 pp. 175-178, XP000199266.

J.H. Povisen et al., "Analysis on Splice, Microbending, Macrobending, and Rayleigh Losses in $GeO_2$ Doped Dispersion-Shifted Single-Mode Fibers", Journal of Lightwave Technology, IEEE vol. 4, No. 7, Jul. 1, 1986, pp. 706-710, XP000541248, ISSN: 0733-8724.

Gilberto M. Camilo et al., "Tensile Strength of High Speed Proof Tested Fiber Optics", Linking to the Next Century Proceedings, 1997 SBMO/IEEE MTT-S International Natal, Brazil Aug. 11-14, 1997, New York, New York USA, IEEE, US, Aug. 11, 1997, pp. 631-636, XP010263380.

* cited by examiner

Fig.7

| | SAMPLE 1 | SAMPLE 2 | SAMPLE 3 | SAMPLE 4 | SAMPLE 5 |
|---|---|---|---|---|---|
| CORE COMPOSITION | $GeO_2$-$SiO_2$ | $GeO_2$-$SiO_2$ | $GeO_2$-$SiO_2$ | $GeO_2$-$SiO_2$ | $GeO_2$-$SiO_2$ |
| CLADDING COMPOSITION | $SiO_2$ | F-$SiO_2$ | F-$SiO_2$ | $SiO_2$ | $SiO_2$ |
| RELATIVE REFRACTIVE INDEX DIFFERENCE (%) | 0.65 | 0.70 | 0.70 | 0.75 | 1.1 |
| CORE DIAMETER (μm) | 5.5 | 5.8 | 4.9 | 5.3 | 6.5 |
| CLADDING DIAMETER (μm) | 125 | 125 | 125 | 80 | 125 |
| COATING OUTER DIAMETER (μm) | 250 | 250 | 250 | 170 | 250 |
| MFD(@1.3μm) (μm) | 6.5 | 6.4 | 6.3 | 6.1 | 5.3 |
| MFD(@1.55μm) (μm) | 7.9 | 7.4 | 7.7 | 7.2 | 6.2 |
| CHROMATIC DISPERSION (@1.3μm) (ps/nm/km) | -6.8 | -4.6 | -10.7 | -7 | -8 |
| CHROMATIC DISPERSION (@1.55μm) (ps/nm/km) | 8.6 | 11 | 7.7 | 7.2 | 6.2 |
| 2m CUTOFF WAVELENGTH (μm) | 1.1 | 1.2 | 1 | 1.1 | 1.25 |
| CABLE CUTOFF WAVELENGTH (μm) | 1 | 1.1 | 0.9 | 1 | 1.16 |
| BENDING LOSS (20mmφ,@1.55μm) (dB/m) | 0.04 | 0.01 or LESS | 0.16 | 0.01 or LESS | 0.01 or LESS |
| BENDING LOSS (15mmφ,@1.55μm) (dB/m) | 0.3 | 0.02 | 1.5 | 0.05 | 0.01 or LESS |
| BENDING LOSS (10mmφ,@1.55μm) (dB/m) | 2 | 0.1 | 13 | 0.3 | 0.01 or LESS |
| MICROBEND LOSS (@1.55μm) (dB/km) | 0.01 or LESS | 0.01 or LESS | 0.01 or LESS | 0.1 | 0.01 or LESS |
| TRANSMISSION LOSS (@1.3μm) (dB/km) | 0.37 | 0.35 | 0.36 | 0.42 | 0.47 |
| TRANSMISSION LOSS (@1.55μm) (dB/km) | 0.21 | 0.20 | 0.21 | 0.23 | 0.24 |

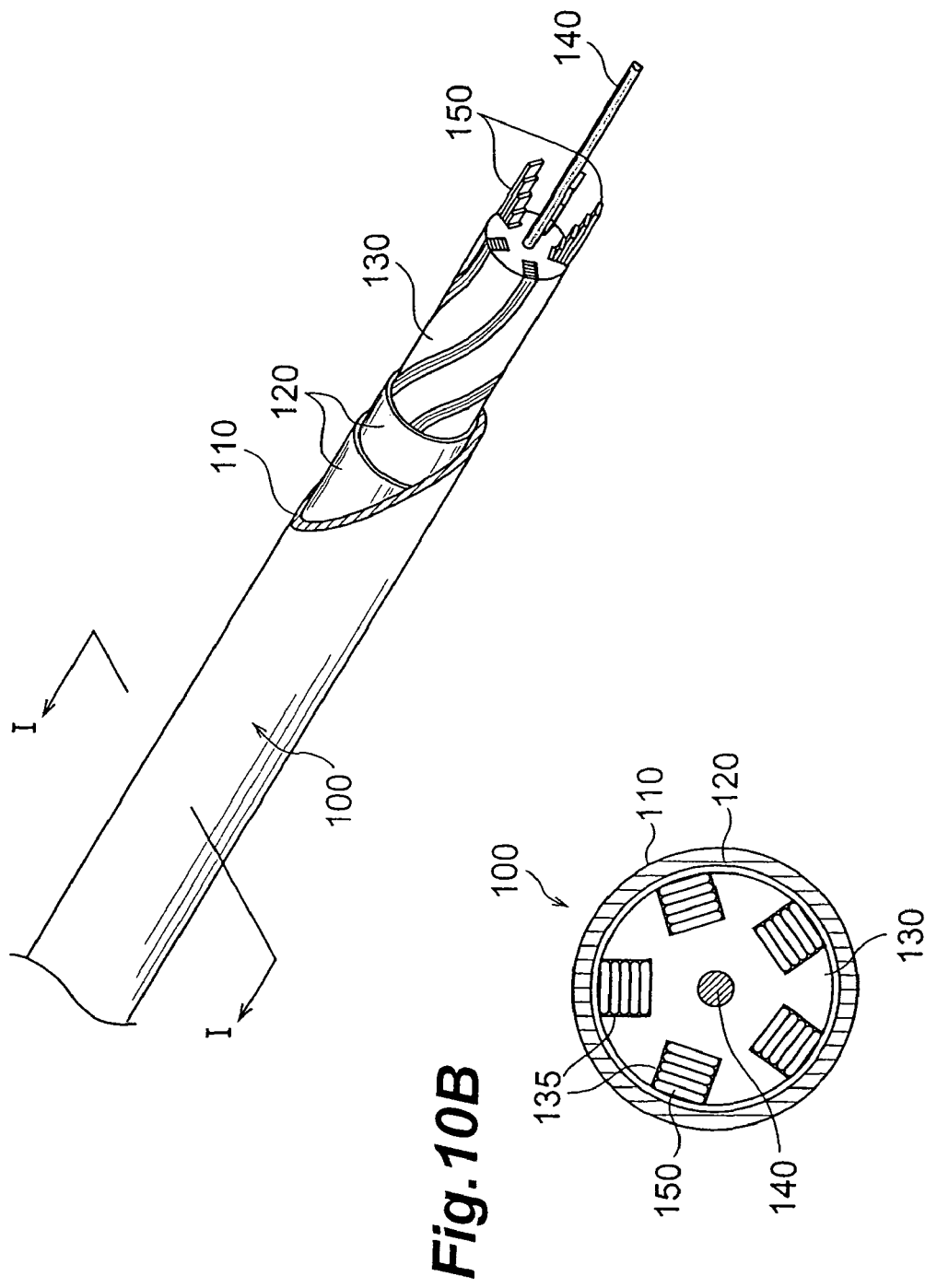

OPTICAL FIBER, OPTICAL FIBER TAPE, OPTICAL CABLE AND OPTICAL CONNECTOR WITH OPTICAL FIBER

BACKGROUND OF THE INVENTION

1. Field of the Invention

The present invention relates to an optical fiber, an optical fiber tape, an optical cable, and an optical connector equipped with an optical fiber, which are suitable for an optical transmission line through which signal light propagates, an optical transmission line of optical access type in particular, in an optical communication system.

2. Related Background Art

Optical communication systems enable high-speed transmission of a large volume of information by transmitting signal light through optical transmission lines. As an optical transmission line through which the signal light propagates, an optical fiber is employed, for example. Since the chromatic dispersion of silica glass, which is a material for an optical fiber, becomes zero in the vicinity of a wavelength of 1.3 µm, single-mode optical fibers for the band of 1.3 µm having a zero-dispersion wavelength near the wavelength of 1.3 µm have been utilized in conventional optical communication systems. Also proposed is a single-mode optical fiber for the band of 1.55 µm, suitable for optical communications in the band of 1.55 µm, having a zero-dispersion wavelength near the wavelength of 1.3 µm. Further, taking account of the fact that the transmission loss of silica glass is minimized at a wavelength of 1.55 µm, a dispersion-shifted optical fiber whose refractive index profile is designed so as to attain a zero-dispersion wavelength near the wavelength of 1.55 µm has been utilized as the above-mentioned optical transmission line. Structures and characteristics of such optical fibers are described, for example, in literature 1—Shojiro Kawakami, et al., "Optical fiber and Fiber type Devices", Baifu-kan, Jul. 10, 1996, pp. 90–113.

Also, optical fibers having a zero-dispersion wavelength between wavelengths of 1.3 µm and 1.55 µm have been proposed as disclosed in Japanese Patent Application Laid-Open No. HEI 11-281840 and literature 2—K. Nakajima, et al., "Design consideration for 1.38 µm zero-dispersion fiber for access and metropolitan networks", The 2001 IEICE Communications Society Conference, SB-12-1 (2001).

SUMMARY OF THE INVENTION

The inventors studied the conventional optical communication systems and, as a result, have found the following problems. The above-mentioned literature 1 suggests that the single-mode optical fibers for the 1.3-µm band are inferior to the single-mode optical fibers and dispersion-shifted optical fibers for the 1.55-µm band in terms of the bending loss characteristic in the 1.55-µm band. Such 1.3-µm band single-mode optical fibers may incur large macrobend and microbend losses in the 1.55-µm band, thus yielding a large loss when packaged with a high density into an optical cable and when wound like a coil upon excess-length processing and the like. Therefore, the single-mode optical fibers for the 1.3-µm band are hard to package with a high density into an optical cable, and its compact excess-length processing is difficult.

Also, the single-mode optical fibers for the 1.3-µm band have a chromatic dispersion with a large absolute value in the 1.55-µm wavelength band, which makes it difficult to transmit signals with a high bit rate in the 1.55-µm band. The same holds for the single-mode optical fibers for the 1.55-µm band. On the other hand, the dispersion-shifted optical fibers have a chromatic dispersion with large absolute value in the 1.3-µm wavelength band, which makes it difficult to transmit signals with a high bit rate in the 1.3-µm band.

By contrast, the optical fibers disclosed in the above-mentioned Japanese Patent Application Laid-Open No. HEI 11-281840 and literature 2 have a zero-dispersion wavelength between wavelengths of 1.3 µm and 1.55 µm, thus exhibiting a chromatic dispersion with a relatively small absolute value in both of the wavelength bands of 1.3 µm and 1.55 µm, which makes it possible to transmit signals with a high bit rate in both of these wavelength bands.

However, the optical fibers disclosed in the above-mentioned Japanese Patent Application Laid-Open No. HEI 11-281840 and literature 2 have been designed for use in middle- to long-haul transmissions based on a wavelength division multiplexing (WDM) transmission system for transmitting multiplexed signal light (WDM signal light) having a plurality of channels. Namely, it is preferred that these optical fibers have an effective area as large as possible so as to restrain signal waveforms from deteriorating due to nonlinear optical phenomena even when signal light having a large power propagates therethrough. Also, these optical fibers are assumed to be used in optical cables for middle- to long-haul transmissions, but not intended for high-density packaging within an optical cable. Hence, there is a possibility of microbend loss occurring when the optical fibers are packaged with a high density within an optical cable.

In order to overcome the problems mentioned above, it is an object of the present invention to provide an optical fiber comprising a structure enabling high-density packaging into an optical cable while making it possible to transmit signals with a high bit rate in both of wavelength bands of 1.3 µm and 1.55 µm, an optical fiber tape including the optical fiber, an optical cable including the optical fiber, and an optical connector equipped with the optical fiber.

The optical fiber according to the present invention comprises various structures making it possible to transmit signals with a high bit rate in both of wavelength bands of 1.3 µm and 1.55 µm, having such an excellent lateral pressure resistance that loss is effectively restrained from increasing even upon severe packaging in optical cables, and enabling high-density packaging into optical cables.

Specifically, the optical fiber according to the present invention comprises a core region extending along a predetermined axis and a cladding region provided on the outer periphery of the core region, and has a cutoff wavelength of 1.26 µm or less but preferably 1.0 µm or more, and a mode field diameter of 8.0 µm or less, preferably 6.5 µm or less, at a wavelength of 1.55 µm. In this specification, "cutoff wavelength" when mentioned as it is refers to cable cutoff wavelength, whereas "mode field diameter" when mentioned as it is refers to Petermann-I mode field diameter.

It will be tolerable if the mode field diameter at a wavelength of 1.55 µm is 7.0 µm or more but 8.0 µm or less even when exceeding 6.5 µm. It will be sufficient if the mode field diameter at a wavelength of 1.55 µm is 5.0 µm or more, preferably 6.0 µm or more. In particular, a mode field diameter of 5 µm or more at a wavelength of 1.3 µm can effectively restrain splice loss from increasing upon connecting with another optical fiber, and can effectively restrain splice loss from increasing due to axial misalignment when such optical fibers are connected together.

Preferably, in order to make it possible to transmit signals with a high bit rate in both of the wavelength bands of 1.3 µm and 1.55 µm, the optical fiber having the structure mentioned above further has a chromatic dispersion with an absolute value of 12 ps/nm/km or less at wavelengths of 1.3 µm and 1.55 µm. For enabling high-density packaging into an optical cable by improving a lateral pressure resistance, the optical fiber comprising the structure mentioned above may further have a microbend loss of 0.1 dB/km or less at a wavelength of 1.55 µm. For improving the high-density packaging state within the optical cable and the long-term reliability in a state bent into a small diameter, the optical fiber comprising the above-mentioned structure may have a proof level of 1.2% or more in a proof test. For enabling long-haul transmissions, the optical fiber comprising the above-mentioned structure may have a transmission loss of 0.5 dB/km or less at a wavelength of 1.3 µm.

While the transmission loss at a wavelength of 1.3 µm is 0.5 dB/km or less, the transmission loss at a wavelength of 1.55 µm is preferably 0.3 dB/km or less. For improving the high-density packaging state within the optical cable or the long-term reliability in a state bent into a small diameter, the optical fiber according to the present invention has a fatigue coefficient n of 50 or more. In the proof test, each optical fiber preferably has a proof level of 1.2% or more, more preferably 2% or more, 3% or more, or 4% or more. When the optical fiber according to the present invention attains a proof level of 1.2% or more in the proof test, it can secure a long-term reliability even when packaged in a high-density state within the optical cable or bent into a small diameter. Here, the proof test is a test for applying a tension to an optical fiber, whereas the proof level of the optical fiber at that time refers to the ratio of elongation of the optical fiber when the tension is applied thereto. The tension applied to the optical fiber in the proof test is determined according to the cross-sectional area of the optical fiber to be measured and the like, and is given as a value inherent in each optical fiber.

Preferably, the optical fiber according to the present invention has a bending loss of 0.1 dB/m or less at a diameter of 20 mm at a wavelength of 1.55 µm. In this case, the increase in loss of the optical fiber is small even when bent into a small diameter upon excess-length processing by winding like a coil at a terminal of an optical cable and the like. Preferably, the optical fiber according to the present invention has a bending loss of 0.1 dB/m or less at a diameter of 15 mm at a wavelength of 1.55 µm, and a bending loss of 0.1 dB/m or less at a diameter of 10 mm at a wavelength of 1.55 µm.

The optical fiber according to the present invention comprises a core region and a cladding region provided on the outer periphery of the core region as mentioned above. When the cladding region is constituted by a single silica glass material, the optical fiber has such a refractive index profile that a part corresponding to the core region has a substantially single-peak form whereas the part corresponding to the cladding region has a substantially flat form. The cladding region may have a depressed cladding structure comprising an inner cladding having a lower refractive index and an outer cladding having a higher refractive index. The optical fiber is easy to make in each case since its profile form is relatively simple. Preferably, the optical fiber has a refractive index profile with a form approximating an α-power distribution where α=1 to 5 within the range from a part yielding the maximum refractive index to a part yielding half the maximum refractive index in a portion corresponding to the core region.

The refractive index profile mentioned above is obtained when the core region is constituted by silica glass doped with $GeO_2$ whereas the cladding region is constituted by pure silica glass or silica glass doped with F. In the case where the cladding region has a depressed cladding structure, this structure is formed when the inner cladding is constituted by silica glass doped with F whereas the outer cladding is constituted by pure silica glass. Thus, a desirable refractive index profile is obtained when each glass region is doped with a refractive index adjusting dopant.

In the optical fiber according to the present invention, the cladding region has an outer diameter of 125±1 µm in general, though the outer diameter may be 60 to 100 µm as well. When the outer diameter is 60 to 100 µm, the possibility of the optical fiber breaking due to bending distortions upon bending into a small diameter decreases, thereby improving its long-term reliability. Here, the difference between the maximum and minimum outer diameters in the cladding region is 1.0 µm or less, preferably 0.5 µm or less. The amount of core eccentricity defined by the amount of deviation between the center of the cladding region and the center of the core region is preferably 0.5 µm or less, more preferably 0.2 µm or less, in order to reduce the splice loss.

The optical fiber according to the present invention may further comprise a coating layer at the outer periphery of the cladding region. Preferably, the coating layer has an outer diameter of 250±30 µm or 200 µm or less. In particular, a coating layer having an outer diameter of 200 µm or less improves the accommodating efficiency when the optical fiber is accommodated within an optical cable, thereby making it possible to reduce the diameter of the optical cable or increase the number of optical fibers accommodated therein.

The coating layer may be constituted by a single layer or a double structure comprising inner and outer coatings, whereas its thickness is preferably 15 µm or more but 37.5 µm or less. When the coating layer is a single layer, its Young's modulus is preferably 10 $kg/m^2$ or more. When the coating layer has a double structure constituted by inner and outer coatings, on the other hand, it is preferred that the inner coating have a Young's modulus of 0.2 $kg/mm^2$ or less and that the outer coating have a Young's modulus of 10 $kg/mm^2$ or more. Here, the outer coating has a thickness of 15 µm or more.

For further decreasing the possibility of breaking due to bending distortions upon bending into a small diameter (i.e., improving the long-term reliability), the optical fiber according to the present invention preferably has a fatigue coefficient n of 50 or more. In this case, the optical fiber may further comprise a carbon coat disposed between the cladding region and the coating layer.

The optical fiber comprising the structure mentioned above can be employed in various optical components. For example, the optical fiber tape according to the present invention comprises a plurality of optical fibers integrally coated with a resin, whereas each of the optical fibers has a structure similar to that of the optical fiber having the structure mentioned above (the optical fiber according to the present invention). Also, the optical cable according to the present invention includes a plurality of optical fibers each having a structure similar to that of the optical fiber having the structure mentioned above (the optical fiber according to the present invention). Further, the optical connector equipped with an optical fiber according to the present invention comprises an optical fiber having the structure mentioned above (the optical fiber according to the present invention) and a connector attached to a leading end part of the optical fiber.

BRIEF DESCRIPTION OF THE DRAWINGS

FIG. 1A is a view showing a cross-sectional structure in a first embodiment of the optical fiber according to the present invention, whereas

FIG. 3A is a view showing a cross-sectional structure in a second embodiment of the optical fiber according to the present invention, whereas

FIG. 7 is a table listing various items in each of the optical fibers of sample Nos. 1 to 5;

FIG. 10A is a view showing a schematic structure of an optical cable according to the present invention, whereas FIG. 10B is a view showing a cross-sectional structure thereof.

DETAILED DESCRIPTION OF THE PREFERRED EMBODIMENTS

In the following, embodiments of the optical fiber and the like according to the present invention will be explained in detail with reference to FIGS. 1A to 4B, 5 to 9, 10A, and 10B. In the explanation of the drawings, constituents identical to each other will be referred to with numerals identical to each other without repeating their overlapping descriptions.

Figure 1A:
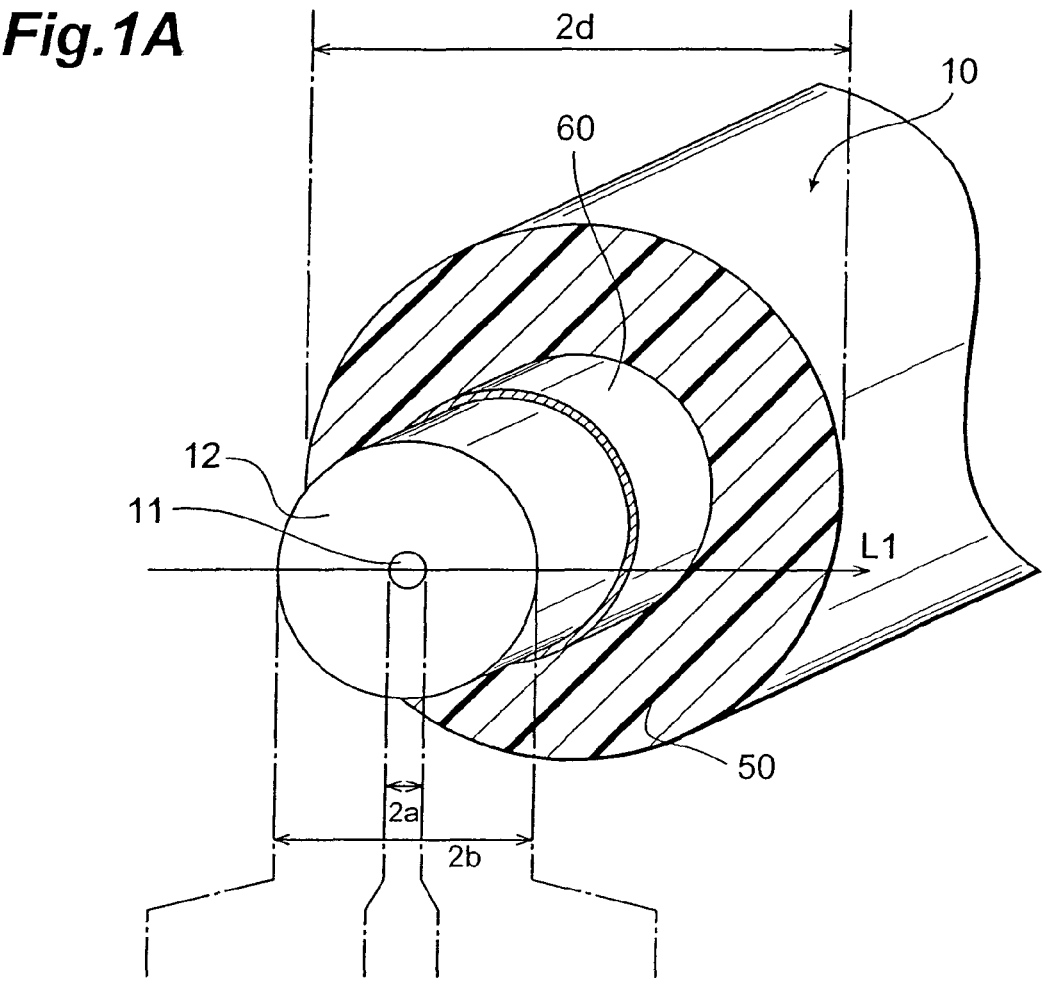
Figure 1B:
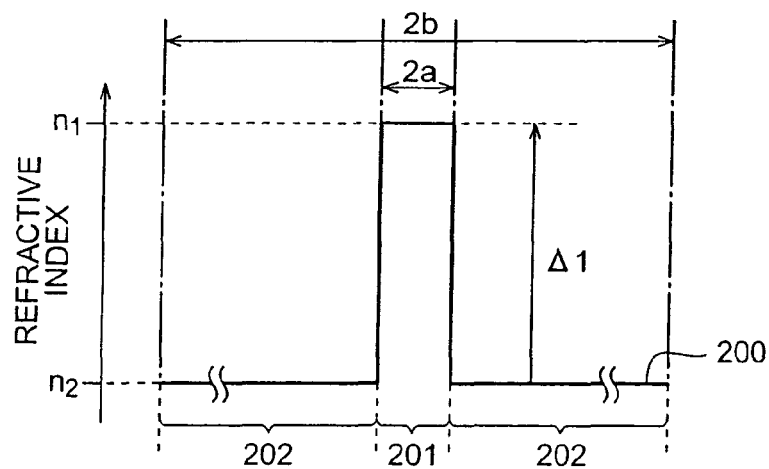
FIG. 1B is a refractive index profile thereof.

FIG. 1A is a view showing a cross-sectional structure of a first embodiment of the optical fiber according to the present invention, whereas FIG. 1B is a refractive index profile thereof. In particular, FIG. 1A shows a cross section of the optical fiber 10 according to the first embodiment orthogonal to the optical axis, whereas FIG. 1B is a refractive index profile 20 indicating the refractive index of each glass region along the line L1 in FIG. 1A. The optical fiber 10 according to the first embodiment comprises a core region 11 having an outer diameter 2a and extending along the optical axis, a cladding region 12 having an outer diameter 2b and surrounding the core region 11, and a coating layer 50 having an outer diameter 2d and surrounding the cladding region 12. For further lowering the possibility of breaking due to bending distortions upon bending into a small diameter (to improve the long-term reliability), a carbon coat 60 may be disposed between the cladding region 12 and the coating layer 50.

The core region 11 and cladding region 12 are mainly composed of silica glass ($SiO_2$), whereas at least one of the core region 11 and cladding region 12 is doped with impurities for adjusting refractive index. Specifically, the refractive index profile 200 is obtained when the core region 11 is constituted by silica glass doped with $GeO_2$ whereas the cladding region 12 is constituted by pure silica glass or silica glass doped with F. The refractive index $n_1$ of the core region 11 is higher than the refractive index $n_2$ of the cladding region 12. Preferably, in the first embodiment, the part corresponding to the core region 11 in the refractive index profile 200 has a substantially single-peak form. Here, the refractive index profile 200 preferably has a form approximating an α-power distribution where α=1 to 5 within the range from a part yielding the maximum refractive index to apart yielding half the maximum refractive index in the portion corresponding to the core region 11. On the other hand, it is preferred that the part corresponding to the cladding region 12 in the refractive index profile 200 have a substantially flat form. In this case, the optical fiber 10 is easy to make, since its profile form is relatively simple.

The refractive index profile 200 shown in FIG. 1B indicates the refractive index of each part along the line L1 in FIG. 1A, whereby areas 201 and 202 indicate the refractive indices of the core region 11 and cladding region 12 on the line L1, respectively. The relative refractive index difference $\Delta_1$ of the core region 11 (having the refractive index $n_1$) with reference to the cladding region 12 (having the refractive index $n_2$) is given by $(n_1-n_2)/n_2$.

Figure 2A:
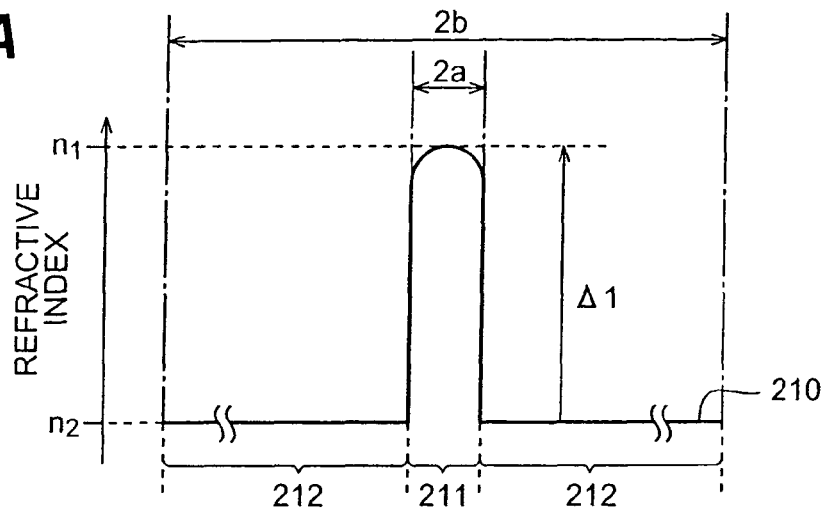
FIGS. 2A to 2C are various refractive index profiles of the optical fiber according to the first embodiment.
Figure 2B:
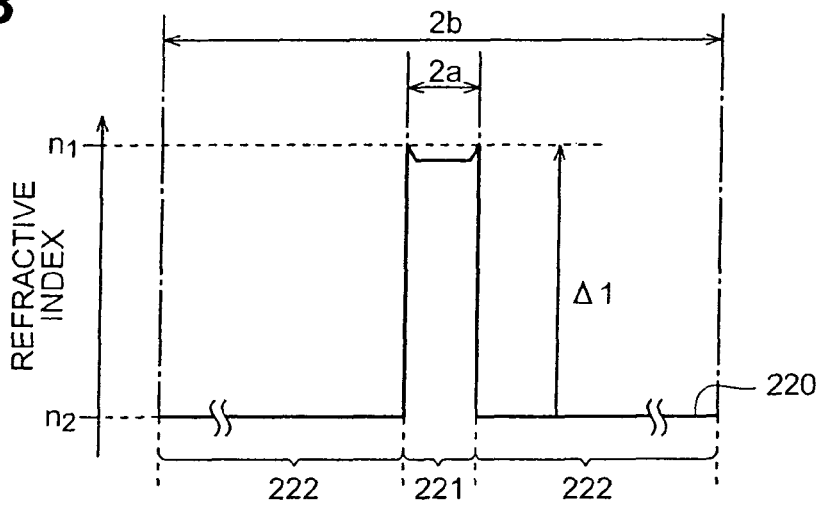
Figure 2C:
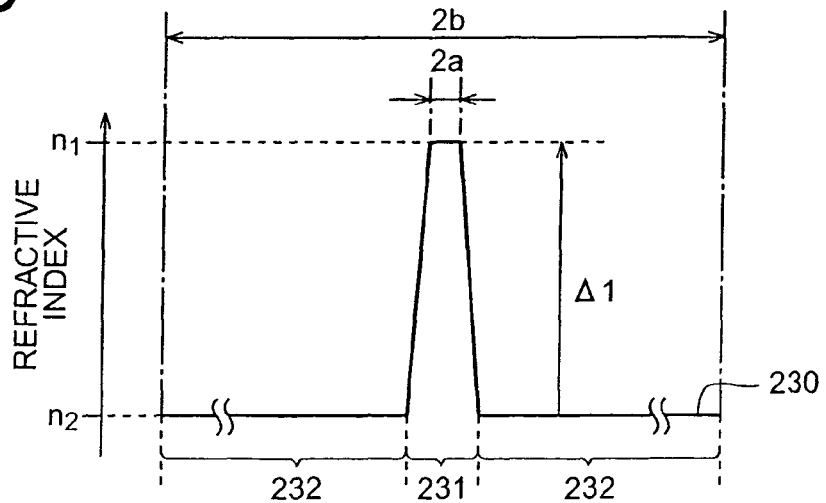

The refractive index profile in which the part corresponding to the core region 11 has "a substantially single-peak form" includes not only ideal stepped forms such as the one shown in FIG. 1B, but also refractive index profiles 210 to 230 shown in FIGS. 2A to 2C. The refractive index profile 210 shown in FIG. 2A has such a form that the area 212 corresponding to the cladding region 12 has a constant refractive index while the center part of the area 211 corresponding to the core region 11 has a refractive index higher than that of its peripheral parts. The refractive index profile 220 shown in FIG. 2B has a substantially stepped form such that the area 222 corresponding to the cladding region 12 has a constant refractive index while peripheral parts of the area 221 corresponding to the core region 11 have a refractive index slightly higher than that of the centerpart. The refractive index profile 230 shown in FIG. 2C has a substantially stepped form such that the area 232 corresponding to the cladding region 12 has a constant refractive index while the refractive index gradually decreases in peripheral parts of the area 231 corresponding to the core region 11.

Figure 3A:
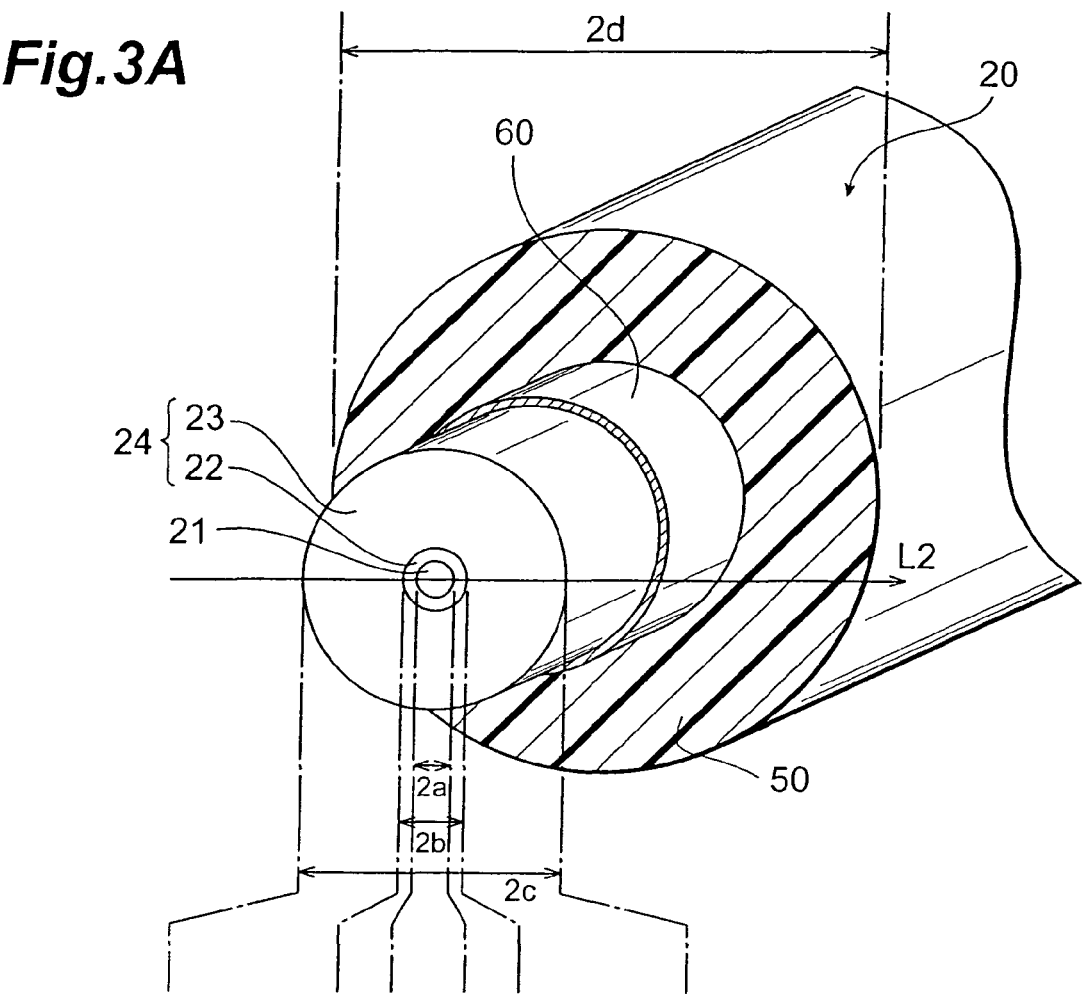
Figure 3B:
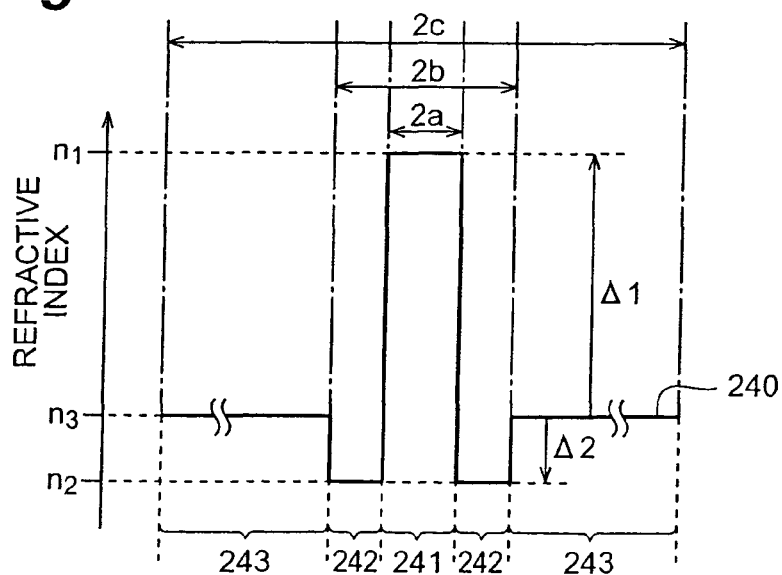
FIG. 3B is a refractive index profile thereof.

FIG. 3A is a view showing a cross-sectional structure of a second embodiment of the optical fiber according to the present invention, whereas FIG. 3B is a refractive index profile thereof. In particular, FIG. 3A shows a cross section of the optical fiber 20 according to the second embodiment orthogonal to the optical axis, whereas FIG. 3B is a refractive index profile 240 indicating the refractive index of each glass region along the line L2 in FIG. 3A. The optical fiber 20 according to the second embodiment comprises a core region 21 having an outer diameter 2a and extending along the optical axis, a cladding region 24 surrounding the core region 21, and a coating layer 50 having an outer diameter 2d and surrounding the cladding region 24. In particular, the optical fiber 200 according to the second embodiment is characterized in that the cladding region 24 has a depressed cladding structure. Namely, the cladding region 24 comprises an inner cladding 22 having an outer diameter 2b and surrounding the core region 21, and an outer cladding 23 having an outer diameter 2c and surrounding the inner cladding 22. For further lowering the possibility of breaking due to bending distortions upon bending into a small diameter (to improve the long-term reliability), a carbon coat 60 may be disposed between the outer cladding 23 and the coating layer 50.

The core region 21 and cladding region 24 are mainly composed of silica glass ($SiO_2$), whereas at least one of the core region 21 and cladding region 24 is doped with impurities for adjusting refractive index. Specifically, in the refractive index profile 240, the core region 21 is constituted by silica glass doped with $GeO_2$. The depressed cladding structure of the cladding region 24 is obtained when the inner cladding 22 is constituted by silica glass doped with F while the outer cladding 23 is constituted by pure silica glass. The refractive index $n_1$ of the core region 21 is higher than each of the refractive index $n_2$ of the inner cladding 22 and the refractive index $n_3$ ($>n_2$) of the outer cladding 23. Preferably, in the second embodiment, the part corresponding to the core region 21 in the refractive index profile 240 has a substantially single-peak form. Here, the refractive index profile 240 preferably has a form approximating an α-power distribution where α=1 to 5 within the range from a part yielding the maximum refractive index to a part yielding half the maximum refractive index in the portion corresponding to the core region 21. In this case, the optical fiber 20 is easy to make, since its profile form is relatively simple.

The refractive index profile 240 shown in FIG. 3B indicates the refractive index of each part along the line L2 in FIG. 3A, whereby areas 241, 242, and 243 indicate the refractive indices of the core region 21, inner cladding 22, and outer cladding 23 on the line L2, respectively. The relative refractive index difference $\Delta_1$ of the core region 21 (having the refractive index $n_1$) with reference to the outer cladding 23 (having the refractive index $n_3$) is given by $(n_1-n_3)/n_3$, whereas the relative refractive index difference $\Delta_2$ of the inner cladding 22 (having the refractive index $n_2$) with reference to the outer cladding 23 (having the refractive index $n_3$) is given by $(n_2-n_3)/n_3$.

In the refractive index profile 240 of the optical fiber 20 according to the second embodiment, the part corresponding to the core region 21 may have not only ideal stepped forms such as the one shown in FIG. 3B, but also forms similar to those of the part corresponding to the core region in the refractive index profiles 210 to 230 shown in FIGS. 2A to 2C.

Though each of the respective cladding regions 12, 24 in the optical fibers 10, 20 according to the first and second embodiments has an outer diameter of 125±1 μm in general, the outer diameter may be 60 to 100 μm as well. When the outer diameter is 60 to 100 μm, the possibility of breaking due to bending distortions upon bending into a small diameter decreases in each of the optical fibers 10, 20, thereby improving its long-term reliability. Here, the difference between the maximum and minimum outer diameters in the cladding region 12, 24 is 1.0 μm or less, preferably 0.5 μm or less. The core eccentricity amount Δc defined by the amount of deviation between the center $O_1$ of the cladding region 12, 24 and the center $O_2$ of the core region 11, 21 is preferably 0.5 μm or less, more preferably 0.2 μm or less, in order to reduce the splice loss (see FIG. 4A).

The optical fiber 10, 20 having the above-mentioned refractive index profile 200 to 240 (the optical fiber according to the present invention) may further comprise a coating layer 50 having an outer diameter of 250±30 μm at the outer periphery of the cladding region 12, 24. On the other hand, the coating layer 50 with an outer diameter 2d of 200 μm or less improves the accommodating efficiency when the optical fiber 10, 20 is accommodated within an optical cable, thereby making it possible to reduce the diameter of the optical cable or increase the number of optical fibers accommodated therein.

Figure 4A:
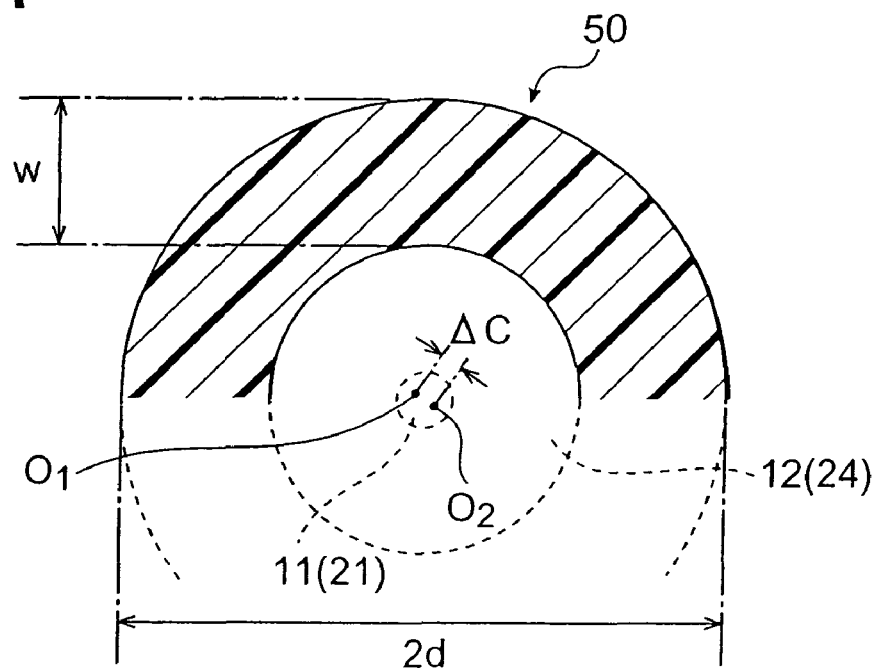
FIGS. 4A and 4B are views showing cross-sectional structures of coating layers in optical fibers according to the present invention.
Figure 4B:
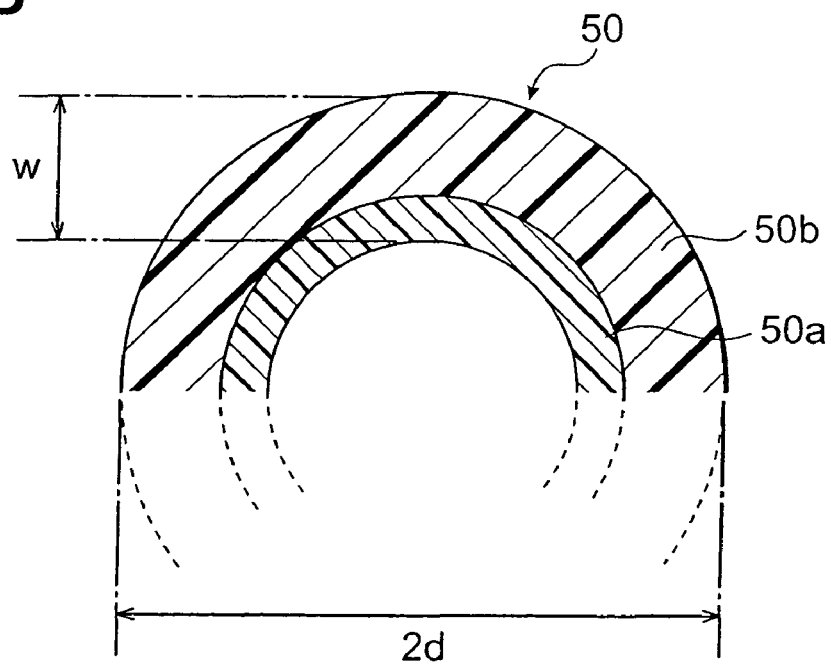

The coating layer 50 may be constituted by a single layer as shown in FIG. 4A or a double structure comprising an inner coating 50a and an outer coating 50b as shown in FIG. 4B, whereas its width w is preferably 15 μm or more but 37.5 μm or less. When the coating layer 50 is a single layer (see FIG. 4A), its Young's modulus is preferably 10 kg/mm² or more. When the coating layer 50 has a double structure constituted by the inner coating 50a and outer coating 50b (see FIG. 4B), it is preferred that the Young's modulus be 0.2 kg/mm² or less in the inner coating 50a and 10 kg/mm² or more in the outer coating 50b. Here, the thickness of the outer coating 50b is 15 μm or more.

Each of the optical fibers 10, 20 according to the first and second embodiments having various refractive index profiles (optical fibers according to the present invention) has a cable cutoff wavelength of 1.26 μm or less but preferably 1.0 μm or more, and a Petermann-I mode field diameter of 8.0 μm or less, preferably 6.5 μm or less, at a wavelength of 1.55 μm. The Petermann-I mode field diameter at the wavelength of 1.55 μm may exceed 6.5 μm if it is 7.0 μm or more but 8.0 μor less. The Petermann-I mode field diameter at the wavelength of 1.3 μm may be 5.0 μm or more, more preferably 6.0 μm or more. In particular, a Petermann-I mode field diameter of 5 μm or more at a wavelength of 1.3 μm can effectively restrain splice loss from increasing upon connecting with another optical fiber, and can effectively restrain splice loss from increasing due to axial misalignment when such optical fibers are connected together.

Here, the mode field diameter MFD according to the Petermann-I definition is given by the following expression:

$$MFD = 2\left(2\frac{\int_0^\infty \phi^2(r)r^3\,dr}{\int_0^\infty \phi^2(r)r\,dr}\right)^{\frac{1}{2}}$$

where the variable r is the radial distance from the optical axis of the optical fiber 10, 20, and Φ (r) is the electric field distribution along a radial direction of the light propagating through the optical fiber 10, 20 and depends on the wavelength of light. The cable cutoff wavelength is the cutoff wavelength of $LP_{11}$ mode at a length of 22 mm, and is a value smaller than the 2-m cutoff wavelength.

Figure 5:
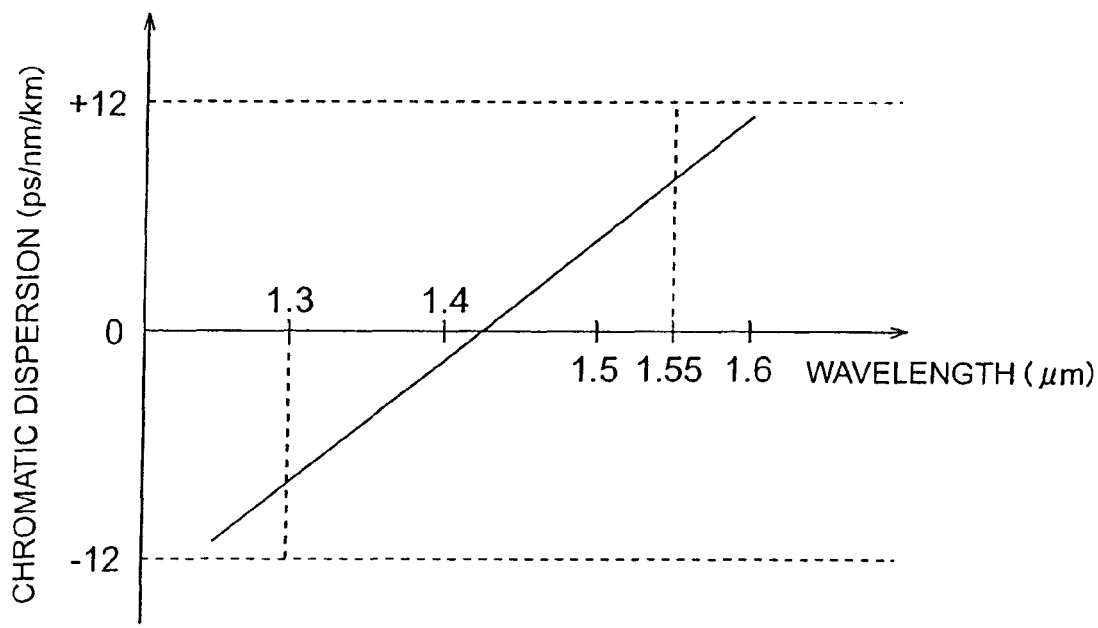
FIG. 5 is a graph showing the chromatic dispersion characteristic of an optical fiber according to the present invention.

Preferably, in order to make it possible to transmit signals with a high bit rate in both of the wavelength bands of 1.3 μm and 1.55 μm, the optical fiber 10, 20 having the structure mentioned above further has a chromatic dispersion with an absolute value of 12 ps/nm/km or less at wavelengths of 1.3 μm and 1.55 μm as shown in FIG. 5. For enabling high-density packaging into an optical cable by improving a lateral pressure resistance, the optical fiber 10, 20 comprising the structure mentioned above may further have a microbend loss of 0.1 dB/km or less at a wavelength of 1.55 μm. For improving the high-density packaging state within the optical cable or the long-term reliability in a state bent into a small diameter, the optical fiber 10, 20 comprising the above-mentioned structure may have a proof level of 1.2% or more in a proof test. For enabling long-haul transmissions, the optical fiber 10, 20 comprising the above-mentioned structure may have a transmission loss of 0.5 dB/km or less at a wavelength of 1.3 μm. Here, FIG. 5 is a graph showing the chromatic dispersion characteristic of an optical fiber according to the present invention.

While the transmission loss at a wavelength of 1.3 µm is 0.5 dB/km or less, the transmission loss at a wavelength of 1.55 µm is preferably 0.3 dB/km or less. For improving the high-density packaging state within the optical cable or the long-term reliability in a state bent into a small diameter, each of the optical fibers 10, 20 according to the first and second embodiments preferably has a fatigue coefficient n of 50or more. In the proof test, each optical fiber preferably has a proof level of 1.2% or more, more preferably 2% or more, 3% or more, or 4% or more. When the optical fiber 10, 20 attains a proof level of 1.2% or more in the proof test, it can secure a long-term reliability even when packaged in a high-density state within the optical cable or bent into a small diameter. Here, the proof test is a test for applying a tension to an optical fiber, whereas the proof level of the optical fiber 10, 20 at that time refers to the ratio of elongation of the optical fiber 10, 20 when the tension is applied thereto. The tension applied to the optical fiber in the proof test is determined according to the cross-sectional area of the optical fiber to be measured and the like, and is given as a value inherent in each optical fiber.

Preferably, the optical fiber according to the present invention has a bending loss of 0.1 dB/m or less at a diameter of 20 mm at a wavelength of 1.55 µm. In this case, the increase in loss of the optical fiber is small even when bent into a small diameter upon excess-length processing by winding like a coil at a terminal of an optical cable and the like. The optical fiber 10, 20 preferably has a bending loss of 0.1 dB/m or less at a diameter of 15 mm at a wavelength of 1.55 µm, and more preferably has a bending loss of 0.1 dB/m or less at a diameter of 10 mm at a wavelength of 1.55 µm.

Figure 6:
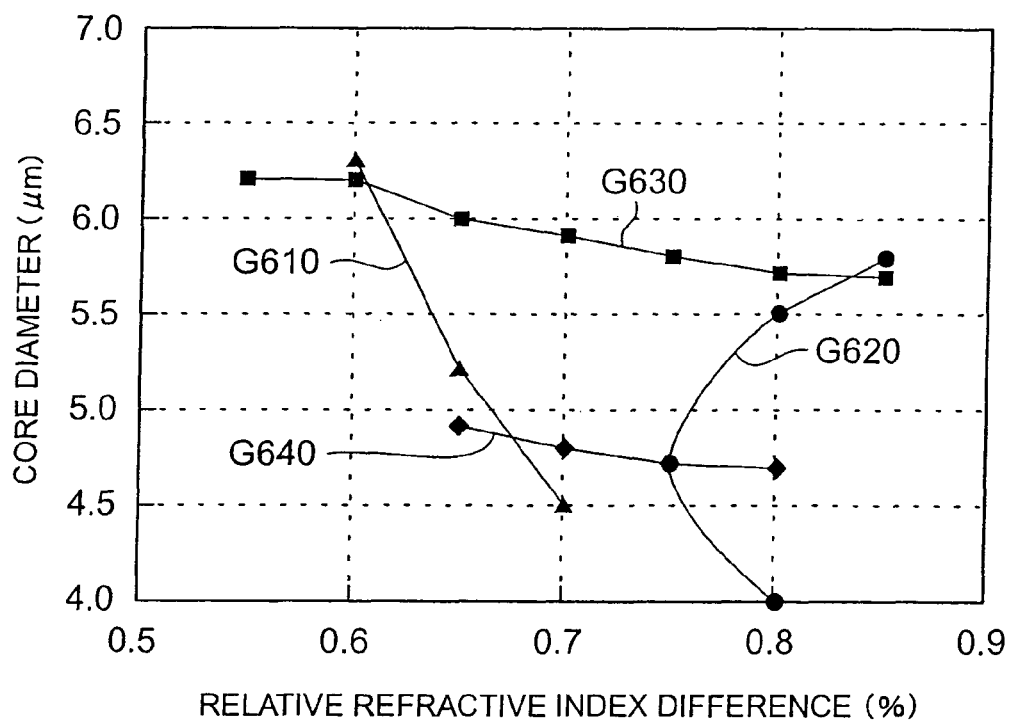
FIG. 6 is a graph showing a favorable range example of the relative refractive index difference Δ and outer diameter 2a in the core region in the optical fiber according to the first embodiment.

FIG. 6 is a graph showing an example of preferred range of the relative refractive index difference Al and outer diameter 2a of the core region in the optical fiber having the stepped refractive index profile 200 (first embodiment). In FIG. 6, the abscissa indicates the relative refractive index difference $\Delta_1$ of the core region 11, whereas the ordinate indicates the outer diameter 2a of the core region 11 of the optical fiber 10. In FIG. 6, curve G610 indicates a relationship yielding a Petermann-I mode field diameter of 8.0 µm at a wavelength of 1.55 µm, curve G620 indicates a relationship yielding a Petermann-I mode field diameter of 6 µm at a wavelength of 1.3 µm, curve 630 indicates a relationship yielding a chromatic dispersion of +12 ps/nm/km at a wavelength of 1.55 µm, and curve 640 indicates a relationship yielding a chromatic dispersion of −12ps/nm/km at a wavelength of 1.3 µm. The area surrounded by these four curves G610 to G640 is a preferable range.

Applied examples of the optical fiber according to the present invention will now be explained. Each of samples prepared has the same structure as that of the optical fiber 10 according to the first embodiment shown in FIGS. 1A and 1B except that no carbon coat 60 is provided. FIG. 7 is a table listing various items in each of the optical fibers according to Samples 1 to 5.

In the optical fiber of Sample 1, the core region is constituted by silica glass doped with $GeO_2$, whereas the cladding region is constituted by pure silica glass. The relative refractive index difference $\Delta_1$ of the core region with reference to the cladding region is 0.65%, the outer diameter 2a of the core region is 5.5 µm, the outer diameter 2b of the cladding region is 125 µm, and the outer diameter 2c of the coating layer is 250 µm. In the optical fiber of Sample 1, the Petermann-I mode field diameter at a wavelength of 1.3 µm is 6.5 µm, the Petermann-I mode field diameter at a wavelength of 1.55 µm is 7.9 µm, the chromatic dispersion at a wavelength of 1.3 µm is −6.8 ps/nm/km, and the chromatic dispersion at a wavelength of 1.55 µm is +8.6 ps/nm/km. Also, in the optical fiber of Sample 1, the 2-m cutoff wavelength is 1.1 µm, the cable cutoff wavelength is 1.0 µm, the bending loss at a bending diameter of 20 mm at a wavelength of 1.55 µm is 0.04 dB/m, the bending loss at a bending diameter of 15 mm at a wavelength of 1.55 µm is 0.3 dB/m, the bending loss at a bending diameter of 10 mm at a wavelength of 1.55 µm is 2 dB/m, and the microbend loss at a wavelength of 1.55 µm is 0.01 dB/km or less. The value of microbend loss is measured with a wire mesh bobbin, and is smaller by about one digit than that of a typical single-mode optical fiber having a zero-dispersion wavelength in the 1.3-µm band. Further, in the optical fiber of Sample 1, the transmission loss at a wavelength of 1.3 µm is 0.37 dB/km, whereas the transmission loss at a wavelength of 1.55 µm is 0.21 dB/km.

Measurement of microbend loss using a wire mesh bobbin is specifically described in J. F. Libert, et al., "The New 160 Gigabit WDM Challenge for Submarine Cable Systems", International Wire & Cable System Proceedings 1998, p. 377 (1-Long length test on wire mesh), FIG. 5.

In the optical fiber of Sample 2, the core region is constituted by silica glass doped with $GeO_2$, whereas the cladding region is constituted by silica glass doped with F element. The relative refractive index difference $\Delta_1$ of the core region with reference to the cladding region is 0.70%, the outer diameter 2a of the core region is 5.8 µm, the outer diameter 2b of the cladding region is 125 µm, and the outer diameter 2c of the coating layer is 250 µm. In the optical fiber of Sample 2, the Petermann-I mode field diameter at a wavelength of 1.3 µm is 6.4 µm, the Petermann-I mode field diameter at a wavelength of 1.55 µm is 7.4 µm, the chromatic dispersion at a wavelength of 1.3 µm is −4.6 ps/nm/km, and the chromatic dispersion at a wavelength of 1.55 µm is +11.0 ps/nm/km. Also, in the optical fiber of Sample 2, the 2-m cutoff wavelength is 1.2 µm, the cable cutoff wavelength is 1.1 µm, the bending loss at a bending diameter of 20 mm at a wavelength of 1.55 µm is 0.01 dB/m or less, the bending loss at a bending diameter of 15 mm at a wavelength of 1.55 µm is 0.02 dB/m, the bending loss at a bending diameter of 10 mm at a wavelength of 1.55 µm is 0.1 dB/m, and the microbend loss at a wavelength of 1.55 µm is 0.01 dB/km or less. Further, in the optical fiber of Sample 2, the transmission loss at a wavelength of 1.3 µm is 0.35 dB/km, whereas the transmission loss at a wavelength of 1.55 µm is 0.20 dB/km.

In the optical fiber of Sample 3, the core region is constituted by silica glass doped with $GeO_2$, whereas the cladding region is constituted by silica glass doped with F element. The relative refractive index difference $\Delta_1$ of the core region with reference to the cladding region is 0.70%, the outer diameter 2a of the core region is 4.9 µm, the outer diameter 2b of the cladding region is 125 µm, and the outer diameter 2c of the coating layer is 250 µm. In the optical fiber of Sample 3, the Petermann-I mode field diameter at a wavelength of 1.3 µm is 6.3 µm, the Petermann-I mode field diameter at a wavelength of 1.55 µm is 7.7 µm, the chromatic dispersion at a wavelength of 1.3 µm is −10.7 ps/nm/km, and the chromatic dispersion at a wavelength of 1.55 µm is +7.7 ps/nm/km. Also, in the optical fiber of Sample 3, the 2-m cutoff wavelength is 1.0 µm, the cable cutoff wavelength is 0.9 µm, the bending loss at a bending diameter of 20 mm at a wavelength of 1.55 µm is 0.16 dB/m, the bending loss at a bending diameter of 15 mm at a wavelength of 1.55 µm is 1.5 dB/m, the bending loss at a bending diameter of 10 mm at a wavelength of 1.55 μm is 13 dB/m, and the microbend loss at a wavelength of 1.55 μm is 0.01 dB/km or less. Further, in the optical fiber of Sample 3, the transmission loss at a wavelength of 1.3 μm is 0.36 dB/km, whereas the transmission loss at a wavelength of 1.55 μm is 0.21 dB/km.

In the optical fiber of Sample 4, the core region is constituted by silica glass doped with $GeO_2$, whereas the cladding region is constituted by pure silica glass. The relative refractive index difference $\Delta_1$ of the core region with reference to the cladding region is 0.75%, the outer diameter $2a$ of the core region is 5.3 μm, the outer diameter $2b$ of the cladding region is 80 μm, and the outer diameter $2c$ of the coating layer is 170 μm. In the optical fiber of Sample 4, the Petermann-I mode field diameter at a wavelength of 1.3 μm is 6.1 μm, the Petermann-I mode field diameter at a wavelength of 1.55 μm is 7.2 μm, the chromatic dispersion at a wavelength of 1.3 μm is −7.0 ps/nm/km, and the chromatic dispersion at a wavelength of 1.55 μm is +7.2 ps/nm/km. Also, in the optical fiber of Sample 4, the 2-m cutoff wavelength is 1.0 μm, the cable cutoff wavelength is 1.0 μm, the bending loss at a bending diameter of 20 mm at a wavelength of 1.55 μm is 0.01 dB/m or less, the bending loss at a bending diameter of 15 mm at a wavelength of 1.55 μm is 0.05 dB/m, the bending loss at a bending diameter of 10 mm at a wavelength of 1.55 μm is 0.3 dB/m, and the microbend loss at a wavelength of 1.55 μm is 0.1 dB/km. Further, in the optical fiber of Sample 4, the transmission loss at a wavelength of 1.3 μm is 0.42 dB/km, whereas the transmission loss at a wavelength of 1.55 μm is 0.23 dB/km.

In the optical fiber of Sample 5, the core region is constituted by silica glass doped with $GeO_2$, whereas the cladding region is constituted by pure silica glass. Also, the refractive index profile of the core region has a form approximating an α-power distribution where α=2.5. The relative refractive index difference $\Delta_1$ of the core region with reference to the cladding region is 1.1%, the outer diameter $2a$ of the core region is 6.5 μm, the outer diameter $2b$ of the cladding region is 125 μm, and the outer diameter $2c$ of the coating layer is 250 μm. In the optical fiber of Sample 5, the Petermann-I mode field diameter at a wavelength of 1.3 μm is 5.3 μm, the Petermann-I mode field diameter at a wavelength of 1.55 μm is 6.2 μm, the chromatic dispersion at a wavelength of 1.3 μm is −8.0 ps/nm/km, and the chromatic dispersion at a wavelength of 1.55 μm is +6.2 ps/nm/km. Also, in the optical fiber of Sample 5, the 2-m cutoff wavelength is 1.25 μm, the cable cutoff wavelength is 1.16 μm, the bending loss at a bending diameter of 20 mm at a wavelength of 1.55 μm is 0.01 dB/m or less, the bending loss at a bending diameter of 15 mm at a wavelength of 1.55 μm is 0.01 dB/m or less, the bending loss at a bending diameter of 10 mm at a wavelength of 1.55 μm is 0.01 dB/m or less, and the microbend loss at a wavelength of 1.55 μm is 0.01 dB/km or less. Further, in the optical fiber of Sample 5, the transmission loss at a wavelength of 1.3 μm is 0.47 dB/km, whereas the transmission loss at a wavelength of 1.55 μm is 0.24 dB/km. Though each of the optical fibers of Samples 1 to 5 has a cladding region with a small outer diameter $2b$ and thus exhibits a low rigidity, its value of microbend loss is smaller than that of a typical single-mode optical fiber.

The optical fiber according to the present invention comprising the above-mentioned structure can be employed in various optical components such as an optical fiber tape, an optical cable, and an optical connector equipped with an optical fiber.

Figure 8:
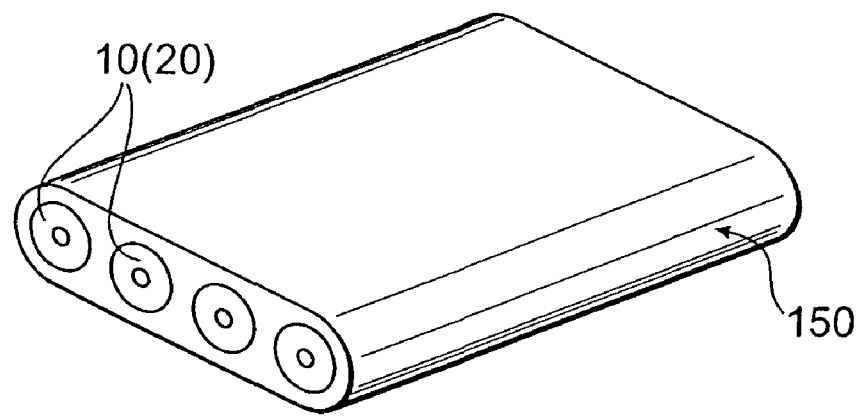
FIG. 8 is a view showing a schematic structure of an optical fiber tape according to the present invention.

FIG. 8 is a view showing a schematic structure of an optical fiber tape employing the optical fiber according to the present invention (an optical fiber tape according to the present invention). This optical fiber tape 150 comprises a plurality of optical fibers integrally coated with a resin, whereas each of the optical fibers has the same structure as that of the optical fiber 10 (20) having the above-mentioned structure.

Figure 9:
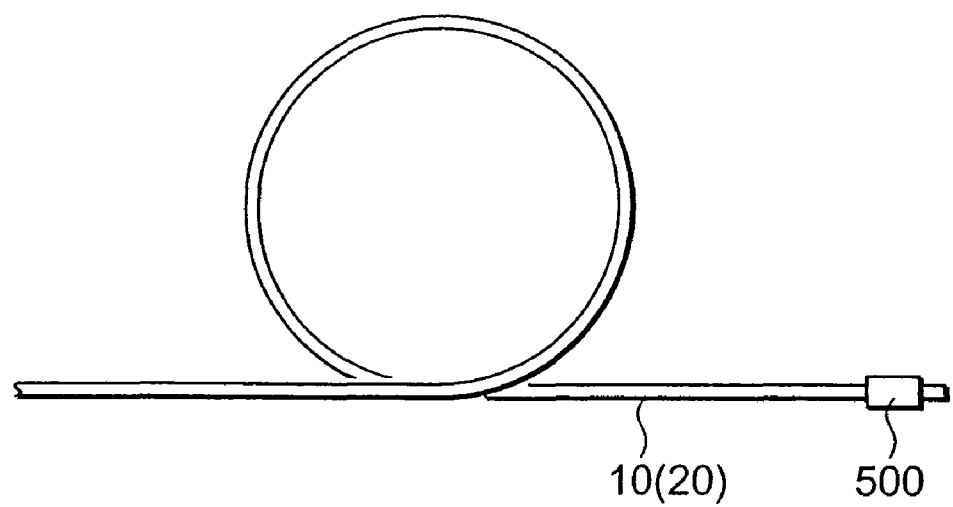
FIG. 9 is a view showing a schematic structure of an optical connector equipped with an optical fiber according to the present invention.

FIG. 9 is a view showing a schematic structure of an optical connector equipped with an optical fiber employing the optical fiber according to the present invention (an optical connector equipped with an optical fiber according to the present invention). This optical connector equipped with an optical fiber comprises the optical fiber 10 (20) having the structure mentioned above, and a connector 500 attached to a leading end part of the optical fiber 10 (20). When this optical connector equipped with an optical fiber is used, a system employing the optical fiber 10 (20) can be operated more functionally.

FIG. 10A is a view showing a schematic structure of an optical cable employing the optical fiber according to the present invention (an optical cable according to the present invention), whereas FIG. 10B is a view showing a cross-sectional structure thereof. In particular, FIG. 10A shows an inner structure of an optical fiber cable 100 including 100-core optical fibers (optical fibers according to the present invention), whereas FIG. 10B is a view showing a cross-sectional structure taken along the line I—I in FIG. 10A. The optical cable 100 contains a slotted rod 130 surrounded by a protective film 120 inside a skin 110. The slotted rod 130 is constituted by a tension member 140 provided on the center thereof and a resin layer surrounding the tension member 140, whereas the surface of the resin layer is formed with a plurality of slots 135 meandering along the longitudinal direction of the tension member 140. Here, the tension member 140 may be constituted by either a single steel wire or a plurality of steel wires twisted together. A plurality of optical fiber tapes 150 are contained within each slot 135.

As explained in the foregoing, the present invention is typically realized by a configuration having a mode field diameter of 8.0 μm or less at a wavelength of 1.55 μm, a cutoff wavelength of 1.26 μm or less, and a chromatic dispersion with an absolute value of 12 ps/nm/km or less at wavelengths of 1.3 μm and 1.55 μm; a configuration having a mode field diameter of 8.0 μm or less at a wavelength of 1.55 μm, a cut off wavelength of 1.26 μm or less, and a microbend loss of 0.1 dB/km or less at a wavelength of 1.55 μm; a configuration having a mode field diameter of 8.0 μm or less at a wavelength of 1.55 μm, a cutoff wavelength of 1.26 μm or less, and a proof level of 1.2% or more in a proof test; or a configuration having a mode field diameter of 6.5 μm or less at a wavelength of 1.55 μm, a cutoff wavelength of 1.26 μm or less, and a transmission loss of 0.5 dB/km or less at a wavelength of 1.3 μm. Various typical configurations such as those mentioned above make it possible to transmit signals with a high bit rate in both of wavelength bands of 1.3 μm and 1.55 μm, while enabling high-density packaging into an optical cable.

The invention claimed is:

1. An optical fiber capable of transmitting signals with a high bit rate in both wavelength bands of 1.3 μm and 1.55 μm, having:
   a cutoff wavelength of 1.26 μm or less;
   a mode field diameter of 8.0 μm or less at a wavelength of 1.55 μm;
   a chromatic dispersion with an absolute value of 12 ps/nm/km or less at wavelengths of 1.3 μm and 1.55 μm; and a microbend loss of 0.1 dB/km or less at the wavelength of 1.55 μm.

2. An optical fiber according to claim 1, having a proof level of 4% or more in a proof test.

3. An optical fiber according to claim 1, wherein the mode field diameter at the wavelength of 1.55 μm is 6.5 μm or less.

4. An optical fiber according to claim 3, having a transmission loss of 0.5 dB/km or less at the wavelength of 1.3 μm.

5. An optical fiber according to claim 1, wherein the cutoff wavelength is 1.0 μm or more.

6. An optical fiber according to claim 1, having a bending loss of 0.1 dB/m or less at a diameter of 20 mm at the wavelength of 1.55 μm.

7. An optical fiber according to claim 1, comprising, at least, a core region extending along a predetermined axis, and a cladding region provided on an outer periphery of said core region; and having such a refractive index profile that a part corresponding to said core region has a substantially single-peak form whereas a part corresponding to said cladding region has a substantially flat form.

8. An optical fiber according to claim 1, comprising, at least, a core region, made of silica glass doped with $GeO_2$, extending along a predetermined axis; and a cladding region made of substantially pure silica glass and provided on an outer periphery of said core region.

9. An optical fiber according to claim 1, comprising, at least, a core region, made of silica glass doped with $GeO_2$, extending along a predetermined axis; and a cladding region made of silica glass doped with fluorine and provided on an outer periphery of said core region.

10. An optical fiber according to claim 1, comprising, at least, a core region extending along a predetermined axis, and a cladding region provided on an outer periphery of said core region; and having a refractive index profile with a form approximating an α-power distribution where α=1 to 5 within the range from a part yielding the maximum refractive index to a part yielding half the maximum refractive index in a portion corresponding to said core region.

11. An optical fiber according to claim 1, comprising, at least, a core region extending along a predetermined axis, and a cladding region provided on an outer periphery of said core region;

said cladding region having an inner cladding provided on the outer periphery of said core region; and an outer cladding, provided on an outer periphery of said inner cladding, having a refractive index higher than that of said inner cladding.

12. An optical fiber according to claim 1, having a fatigue coefficient n of 50 or more.

13. An optical fiber tape including the optical fiber according to claim 1.

14. An optical cable including the optical fiber according to claim 1.

15. An optical connector equipped with an optical fiber comprising the optical fiber according to claim 1 and a connector attached to a leading end part of said optical fiber.

16. An optical fiber capable of transmitting signals with a high bit rate in both wavelength bands of 1.3 μm and 1.55 μm, having:

a cutoff wavelength of 1.26 μm or less;
a mode field diameter of 8.0 μm or less at a wavelength of 1.55 μm; and a chromatic dispersion with an absolute value of 12 ps/nm/km or less at wavelengths of 1.3 μm and 1.55 μm, wherein the mode field diameter at the wavelength of 1.3 μm is 5.0 μm or more.

17. An optical fiber having:
a cutoff wavelength of 1.26 μm or less;
a mode field diameter of 8.0 μm or less at a wavelength of 1.55 μm; and
a microbend loss of 0.1 dB/km or less at the wavelength of 1.55 μm.

18. An optical fiber according to claim 17, having a chromatic dispersion with an absolute value of 12 ps/nm/km or less at wavelengths of 1.3 μm and 1.55 μm.

19. An optical fiber according to claim 17, having a proof level of 1.2% or more in a proof test.

20. An optical fiber according to claim 17, wherein the mode field diameter at the wavelength of 1.55 μm is 6.5 μm or less.

21. An optical fiber according to claim 20, having a transmission loss of 0.5 dB/km or less at the wavelength of 1.3 μm.

22. An optical fiber according to claim 17, wherein the mode field diameter at the wavelength of 1.3 μm is 5.0 μm or more.

23. An optical fiber according to claim 17, wherein the cutoff wavelength is 1.0 μm or more.

24. An optical fiber according to claim 17, having a bending loss of 0.1 dB/m or less at a diameter of 20 mm at the wavelength of 1.55 μm.

25. An optical fiber according to claim 17, comprising, at least, a core region extending along a predetermined axis, and a cladding region provided on an outer periphery of said core region; and having such a refractive index profile that a part corresponding to said core region has a substantially single-peak form whereas a part corresponding to said cladding region has a substantially flat form.

26. An optical fiber according to claim 17, comprising, at least, a core region, made of silica glass doped with $GeO_2$, extending along a predetermined axis; and a cladding region made of substantially pure silica glass and provided on an outer periphery of said core region.

27. An optical fiber according to claim 17, comprising, at least, a core region, made of silica glass doped with $GeO_2$, extending along a predetermined axis; and a cladding region made of silica glass doped with fluorine and provided on an outer periphery of said core region.

28. An optical fiber according to claim 17, comprising, at least, a core region extending along a predetermined axis, and a cladding region provided on an outer periphery of said core region; and having a refractive index profile with a form approximating an α-power distribution where α=1 to 5 within the range from a part yielding the maximum refractive index to a part yielding half the maximum refractive index in a portion corresponding to said core region.

29. An optical fiber according to claim 17, comprising, at least, a core region extending along a predetermined axis, and a cladding region provided on an outer periphery of said core region;

said cladding region having an inner cladding provided on the outer periphery of said core region; and an outer cladding, provided on an outer periphery of said inner cladding, having a refractive index higher than that of said inner cladding.

30. An optical fiber according to claim 17, having a fatigue coefficient n of 50 or more.

31. An optical fiber tape including the optical fiber according to claim 17.

32. An optical cable including the optical fiber according to claim 17.

33. An optical connector equipped with an optical fiber comprising the optical fiber according to claim 17 and a connector attached to a leading end part of said optical fiber.

34. An optical fiber having:
a cutoff wavelength of 1.26 µm or less;
a mode field diameter of 6.5 µm or less at a wavelength of 1.55 µm; and
a transmission loss of 0.5 dB/km or less at a wavelength of 1.3 µm.

35. An optical fiber according to claim 34, having a chromatic dispersion with an absolute value of 12 ps/nm/km or less at the wavelengths of 1.3 µm and 1.55 µm.

36. An optical fiber according to claim 34, having a microbend loss of 0.1 dB/km or less at the wavelength of 1.55 µm.

37. An optical fiber according to claim 34, having a proof level of 1.2% or more in a proof test.

38. An optical fiber according to claim 34, having a transmission loss of 0.3 dB/km or less at the wavelength of 1.55 µm.

39. An optical fiber according to claim 34, wherein the mode field diameter at the wavelength of 1.3 µm is 5.0 µm or more.

40. An optical fiber according to claim 34, wherein the cutoff wavelength is 1.0 µm or more.

41. An optical fiber according to claim 34, having a bending loss of 0.1 dB/m or less at a diameter of 20 mm at the wavelength of 1.55 µm.

42. An optical fiber according to claim 34, comprising, at least, a core region extending along a predetermined axis, and a cladding region provided on an outer periphery of said core region; and
having such a refractive index profile that a part corresponding to said core region has a substantially single-peak form whereas a part corresponding to said cladding region has a substantially flat form.

43. An optical fiber according to claim 34, comprising, at least, a core region, made of silica glass doped with $GeO_2$, extending along a predetermined axis; and a cladding region made of substantially pure silica glass and provided on an outer periphery of said core region.

44. An optical fiber according to claim 34, comprising, at least, a core region, made of silica glass doped with $GeO_2$, extending along a predetermined axis; and a cladding region made of silica glass doped with fluorine and provided on an outer periphery of said core region.

45. An optical fiber according to claim 34, comprising, at least, a core region extending along a predetermined axis, and a cladding region provided on an outer periphery of said core region; and
having a refractive index profile with a form approximating an α-power distribution where α=1 to 5 within the range from a part yielding the maximum refractive index to a part yielding half the maximum refractive index in a portion corresponding to said core region.

46. An optical fiber according to claim 34, comprising, at least, a core region extending along a predetermined axis, and a cladding region provided on an outer periphery of said core region;
said cladding region having an inner cladding provided on the outer periphery of said core region; and an outer cladding, provided on an outer periphery of said inner cladding, having a refractive index higher than that of said inner cladding.

47. An optical fiber according to claim 34, having a fatigue coefficient n of 50 or more.

48. An optical fiber tape including the optical fiber according to claim 34.

49. An optical cable including the optical fiber according to claim 34.

50. An optical connector equipped with an optical fiber comprising the optical fiber according to claim 34 and a connector attached to a leading end part of said optical fiber.

* * * * *